(12) United States Patent
Pascal et al.

(10) Patent No.: US 8,433,172 B2
(45) Date of Patent: Apr. 30, 2013

(54) OPTICAL GUIDE AND OCULAR VISION OPTICAL SYSTEM

(75) Inventors: Benoit Pascal, Liffré (FR); Dubroca Guilhem, Rennes (FR); Sarayeddine Khaled, Chateaugirm (FR)

(73) Assignee: OPT Invent, Rennes (FR)

( * ) Notice: Subject to any disclaimer, the term of this patent is extended or adjusted under 35 U.S.C. 154(b) by 309 days.

(21) Appl. No.: 12/745,881

(22) PCT Filed: Dec. 11, 2008

(86) PCT No.: PCT/EP2008/067300
§ 371 (c)(1),
(2), (4) Date: Jun. 2, 2010

(87) PCT Pub. No.: WO2009/074638
PCT Pub. Date: Jun. 18, 2009

(65) Prior Publication Data
US 2010/0260455 A1  Oct. 14, 2010

(30) Foreign Application Priority Data

Dec. 13, 2007 (FR) .................................. 07 08694
Sep. 12, 2008 (FR) .................................. 08 56162

(51) Int. Cl.
*G02B 6/00* (2006.01)

(52) U.S. Cl.
USPC .............. 385/146; 385/31; 359/630; 359/633

(58) Field of Classification Search .......................... None
See application file for complete search history.

(56) References Cited

U.S. PATENT DOCUMENTS

| 4,711,512 A * | 12/1987 | Upatnieks ........................ 345/7 |
| 5,224,198 A * | 6/1993 | Jachimowicz et al. ........ 385/133 |
| 6,671,100 B1 * | 12/2003 | McRuer .......................... 359/630 |
| 6,825,987 B2 * | 11/2004 | Repetto et al. ................ 359/633 |
| 8,059,342 B2 * | 11/2011 | Burke ............................ 359/630 |
| 2002/0172031 A1 | 11/2002 | Masuda |
| 2003/0086135 A1 | 5/2003 | Takeyama |
| 2005/0069254 A1 | 3/2005 | Schultheis et al. |
| 2006/0018014 A1 * | 1/2006 | Niv et al. ....................... 359/407 |
| 2006/0132914 A1 * | 6/2006 | Weiss et al. ................... 359/462 |
| 2008/0094586 A1 | 4/2008 | Hirayama |
| 2009/0190222 A1 * | 7/2009 | Simmonds et al. ........... 359/567 |
| 2012/0002295 A1 * | 1/2012 | Dobschal et al. ............. 359/630 |
| 2012/0057253 A1 * | 3/2012 | Takagi et al. ................. 359/861 |

FOREIGN PATENT DOCUMENTS

| WO | WO 01/95027 | 12/2001 |
| WO | WO 2005/024969 | 3/2005 |
| WO | WO 2006/061927 | 6/2006 |
| WO | WO 2009/074638 | 6/2009 |

* cited by examiner

*Primary Examiner* — Mike Stahl
(74) *Attorney, Agent, or Firm* — Thorpe North & Western LLP (57) ABSTRACT

The invention relates to optical guides and more precisely to guides for conveying an image without deforming the same. These guides can particularly be used in the production of ocular-vision optical systems more currently named informative spectacles. The optical guide includes an extraction section made of reflective microstructures at the surface of the guide. The microstructures define prisms having a calculated angle in order to send back the light beam at a given angle relative to the opposite surface enabling the exit thereof from the guide. Advantageously, the cut and the arrangement of said microstructures make them invisible to the eye while generating a large and comfortable image.

20 Claims, 4 Drawing Sheets

OPTICAL GUIDE AND OCULAR VISION OPTICAL SYSTEM

This is a National Stage of International Application no. PCT/EP2008/067300.

The present invention concerns the field of optical guides and more particularly guides enabling an image to be transported without deformation. Such guides can in particular be used for making ocular vision optical systems, more commonly referred to as informative spectacles.

An optical guide generally consists of an entry section through which the image is introduced. The image is formed by a light beam issuing from a source that may be matrix of LCD (liquid crystal display) pixels illuminated by a light source. It may also be a matrix of OLED (organic light-emitting diode) pixels. An optical system makes it possible to project this image to infinity. Collimated beams are spoken of. This collimated beam is introduced into the injection section of the optical guide. This guide may for example be formed by a material having two parallel faces. The beam propagates inside the guide by total internal reflection or by virtue of a specific treatment of the walls. The beam then arrives at an extraction system enabling it to leave the optical guide.

The extraction system can consist of a reflector terminating the guide in an inclined plane joining the two faces. Such a guide is described in the American patent published under the reference US 2003/0086135. This system is very limited in terms of viewing angle.

The international patent published under the reference WO 2001/095027 by the company Lumus describes an extraction system composed of a series of inclined parallel semi-reflectors integrated in the thickness of the optical guide. This system makes it possible to broaden the zone in which the eye can see the image, a zone referred to as the eye box. It also makes it possible to obtain larger viewing angles than those obtained by the previous system. However, expensive to produce because of the integration of the semi-reflectors at the core of the guide.

The invention aims to solve the above problems by means of an optical, guide provided with an extraction system consisting of reflective microstructures on the surface of the guide. These microstructures form prisms having an angle calculated to return the light beam at an angle with the opposite face enabling it to leave the guide. Advantageously, the size and arrangement of these microstructures make them invisible to the eye while generating a large, comfortable image.

The extraction system according to the present invention offers the advantage of being simple and inexpensive because it can be integrated in the optical guide manufacturing mould. A simple reflective coating is deposited on the inclined surface of the prisms.

The invention concerns a device for the optical guidance of a light beam transporting an image comprising a material forming the guide provided with two faces; an injection section enabling the light beam to enter the guide, the beam propagating in the guide by successive reflections on the two faces of the guide; an extraction system enabling the beam leave, and where the extraction system comprises at least one microstructure situated on the surface of one of the two faces of the guide and comprising a flat surface causing the light rays of the beam striking the said flat surface to leave the guide.

According to a particular embodiment of the invention, the two faces of the guide are parallel.

According to a particular embodiment of the invention, the two faces of the guide are flat, the light beam transporting the image then being collimated.

According to particular embodiment of the invention, the flat surface of the microstructure being reflective, the light rays of the beam striking the flat surface leave the guide through the face of the guide opposite to the face on which the said microstructure is situated.

According to a particular embodiment of the invention, the said microstructure is composed of a prism projecting on the face of the guide.

According to a particular embodiment of the invention, the said microstructure is composed of a prism recessed on the face of the guide.

According to a particular embodiment of the invention, the extraction section comprises a plurality of microstructures.

According to a particular embodiment of the invention, interstitial spaces formed from flat sections in line with the surface of the guide are disposed between the said microstructures.

According to a particular embodiment of the invention, the said extraction section is composed of several zones, each zone being characterised by a particular arrangement of the microstructures and interstitial spaces.

According to a particular embodiment of the invention, the microstructure is a band over the entire length of the extraction zone.

The invention also concerns an optical guidance device as described above where, the exit image defining two extreme rays forming respectively angles $\omega_-$ and $\omega_+$ with the normal to the extraction surface of the guide outside the guide and $\omega_{n_-}$ and $\omega_{n_+}$ with the normal to the extraction surface of the guide inside the guide, the angle $\mu$ formed by the mirror with the extraction surface has a value less than an angle $$\mu_- = \frac{\pi/2 - \omega_{n+}}{3}$$

or greater than an angle $$\mu_+ = \frac{\pi/2 - \omega_{n-}}{3}.$$

The invention also concerns a method of manufacturing an optical guidance device as described previously, comprising a step of generating at least one microstructure on the surface of one of the two faces of an optical guide by moulding the said microstructure and a step of depositing a reflective thin film on one of the faces of the said microstructure.

The invention also concerns an ocular vision optical system characterised in that it comprises an optical guidance device as described previously.

The features of the invention mentioned above, as well as others, will emerge more clearly from a reading of the following description of an example embodiment, the said description being given in relation to the accompanying drawings, among which.

The present invention consists of an optical guide enabling an image to be transported without deformation. The invention will be described with reference to a particular embodiment intended to be used in an ocular vision optical system. The invention can however be used in any other field using optical guides such as screens integrated in car windscreens or in the cockpit of an aircraft.

Figure 1:
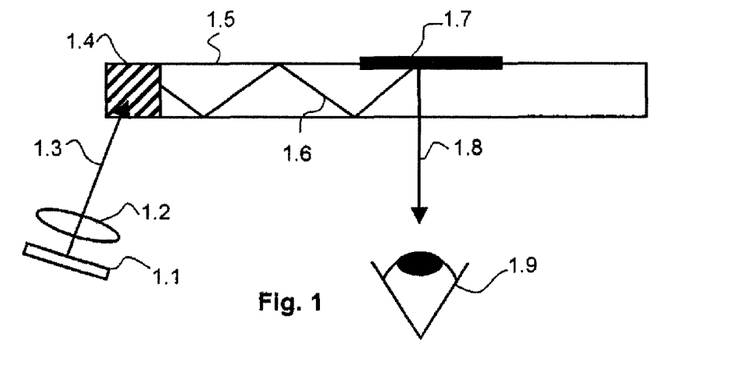
FIG. 1 illustrates the general diagram of the example embodiment of the invention.

The general scheme of the example embodiment is illustrated in FIG. 1. A light source 1.1 generates a light image intended to pass through the optical guide. This source can consist of a matrix of LCD pixels having rear lighting or a matrix of OLED pixels. Any luminous image source can be used here. This image is projected to infinity, that is to say collimated, by an optical system 1.2. The various pixels of the image are therefore projected by a cluster of parallel light rays 1.3 output from the optical system 1.2. The vision field is defined by the focal length of the lens and by the semi-diagonal of the image to be projected. The collimated beam 1.3 enters the optical guide 1.5 through an injection section 1.4. This injection section is detailed in FIG. 2. The beam is then transported in the optical guide 1.5 over an arbitrary length. The optical guide 1.5 consists of a material transparent to light and having two parallel faces. The light beam 1.6 is guided by these two faces and propagates by total reflection in the guide. If the index of the transparent material making up the guide is higher than those of the surrounding media, total internal reflections naturally occur as soon as the angle of incidence of the rays of the beam is sufficiently small with respect to the face of the guide. Alternatively, if the external indices are greater or equal, it is possible to have a deposit of thin films of dielectric material in order, within certain limits, to supplement the total internal reflection condition. The beam then arrives in a zone called the extraction section 1.7. This zone enables the beam to leave the guide. This extraction zone 1.7 is situated on one of the faces of the guide. It will make it possible to return the light rays constituting the beam towards the other face at a substantially perpendicular angle which will enable them to leave the guide. The beam 1.8 that has left the guide can then be projected towards a sensor 1.9, which may be the eye of the user in the case of an ocular vision optical system.

Figure 2:
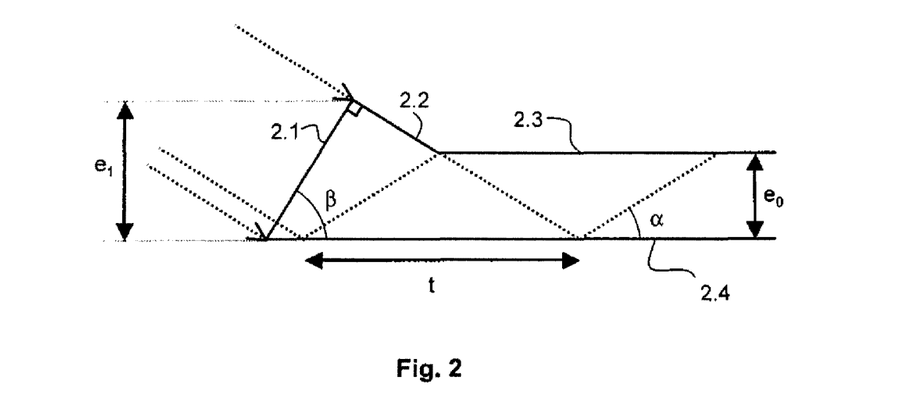
FIG. 2 illustrates the entry section of the example embodiment of the invention.

FIG. 2 illustrates the injection section 1.4 as produced in the example embodiment of the invention. Other implementations of the injection section are possible without departing from the scope of the invention in so far as the light beam enters the guide without undergoing any degradation liable to degrade the image. The injection section is composed of a flat entry face 2.1 forming an angle $\beta$, different from 90°, with the plane of the parallel surfaces of the guide. The collimated beam enters perpendicular to this entry face. A descending facet 2.2 connects this entry face and the top surface 2.3 of the guide. This facet is perpendicular to the entry face. Advantageously this facet is absorbent in order to prevent stray images. The light rays of the beam pass through the entry face and strike the bottom face 2.4 of the optical guide. The angle $\beta$ is calculated so that the angle of incidence $\alpha$ of the rays with the bottom face 2.4 of the guide allows total reflection of the ray. The ray thus injected into the optical guide is trapped and propagates along the guide by reflection on the parallel surfaces of the latter. It keeps the angle of incidence $\alpha$ during each bounce against the surfaces of the guide. In this system holes may appear between each bounce of the beam on one of the faces. If the thickness of the guide is termed $e_0$, the distance s between two bounces of a ray is: $s = e_0 \tan(\beta)$.

The incoming beam spreads over a distance: $t = 2 e_0 / \sin(2\beta)$.

For there to be no holes, it is necessary that $2s < t$. However, for $\beta > 45°$, $2s < t$. To assist total internal reflections, it is desirable that this condition $\beta > 45°$ be satisfied.

To minimise these holes, it is possible to increase the width of the entry face. If the distance between the top of the entry face and the bottom face of the guide is called $e_1$, there must be the following condition for a ray of incidence normal to the entry face and to no longer have any holes:

$$e_0 \cdot \tan(\beta) = e_1 / \sin(\beta); \text{ ie:}$$

$$e_1 = 2 e_0 / \sin^2(\beta).$$

It should be noted however that, if the incoming rays are not normal to the entry surface, holes may still exist. To balance the holes, it may be decided to ensure that the hole is zero for an angle of incidence different from the normal by enlarging the entry face and/or acting on the angle that the descending facet makes with the entry face.

The extraction section is a section comprising microstructures. These microstructures are disposed on the surface of the optical guide on one of the faces of this guide, the extracted rays leaving through the opposite face of the guide. They may be refractive or reflective. The structure may be unidimensional, composed of extracting lines, or bidimensional formed by a mosaic of extracting elements. The extracting elements are for example prisms with a flat face the active angle of which is constant along the structure. The size and arrangement of these structures depend on the application using the guide. In the case of an ocular vision optical system, the size of microstructures will advantageously be small compared with the size of the pupil of the eye, for example around a few tens of μm. In this way, the image does not vary according to the position and movements of the eye. Because of their and their short distance from the eye, these microstructures are also invisible to the naked eye. Moreover, these microstructures do not fully cover the face of the guide, the latter remains transparent and allows vision through the guide while displaying the image issuing from the guide. The system allows see through.

Figure 3:
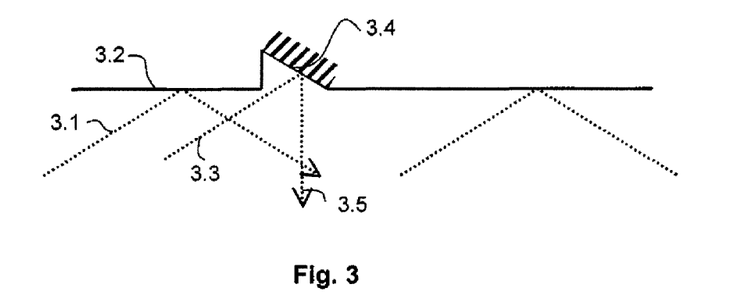
FIG. 3 illustrates the functioning of an element of the extraction section.

The example embodiment is based on reflective microstructures. The structure of one of these microstructures is illustrated in FIG. 3. The microstructure 3.4 is formed on the surface of the face 3.2 of the guide. It forms a prism projecting from this surface 3.2. An incident ray of the light beam 3.1 that strikes the surface of the guide is totally reflected in order to continue its travel within the guide. On the other hand, an incident ray 3.3 that strikes the inclined face of the microstructure 3.4 is reflected as a ray 3.5 towards the second face of the guide at an angle close to the normal.

Because of this, the ray 3.5 reflected, by the microstructure 3.4 is not reflected by the second surface and leaves the guide. The microstructure is therefore formed on the face opposite to the image exit face.

The microstructure can be formed on the face of the optical guide by moulding when the said guide is manufactured. It then suffices to deposit a reflective film such as aluminium or silver on the inclined face of the microstructure. The width of the microstructure must be greater than the wavelength of the visible light and therefore at least 10 µm. For the envisaged application of ocular vision optical system, its width must remain small compared with the thickness of the guide and compared with the size of the pupil of the eye, and therefore in practice less than 200 µm. The reader will understand that, in different applications, other sizes of microstructure can be envisaged without departing from the scope of the invention. Alternatively the prisms can be formed not projecting but by hollows in the surface without modifying the functioning of the microstructures. These microstructures can take varied forms provided that they have a face reflecting the incident rays at an angle close to the normal to the exit face of the optical guide.

With regard to the arrangement of these microstructures on the surface of the guide, great freedom is offered in the design. This arrangement depends typically on the constraints relating to the application sought by the optical guide. In absolute terms, the existence of only one of these microstructures having a width at least equal to 10 µm makes it possible to bring an image out of the guide. In practice, in order to obtain quality images offering a wide field of vision, a set of these microstructures will be available on the surface of the guide. It may be envisaged completely covering an extraction zone with, such microstructures. However, all the rays being thereby extracted by said zone, the eye box offered is limited. In the example embodiment of the invention, the guide comprising two parallel flat faces, all the incident rays arrive substantially with the same angle of incidence on the microstructures. They will therefore be provided with reflective flat surfaces all having the same angle. In some embodiments, for example if the guide is curved, the angle of the flat surface of the microstructures may vary from one microstructure to another. Advantageously, the microstructures will be disposed on the surface so as to have so-called interstitial spaces between the microstructures. Advantageously, these spaces will be flat in continuity with the surface of the guide. In this way, only some of the incident rays will be reflected by the extraction zone, while others will be reflected by the interstitial zones and will continue their path in the guide. It is therefore possible to provide several extraction, zones each enabling an image to be extracted. This arrangement makes it possible to obtain a wide eye box and a broad field of vision affording great comfort in vision. Moreover, the interstitial zones, that is to say the zones not covered with microstructures and fitting between the latter, are transparent and their existence makes it possible to obtain the effect of through vision that preserves the possibility of scenes beyond the guide.

Figure 4:
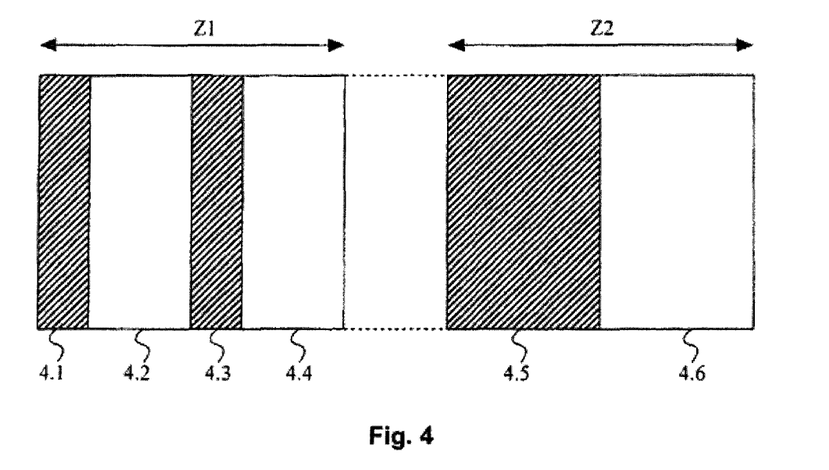
FIG. 4 illustrates a possible distribution of the elements of the extraction section.

FIG. 4 shows an example of an arrangement of these microstructures in two extraction zones. A first extraction zone Z1 is composed of a repetition of an elementary structure composed of a microstructure 4.1 forming a band the length of which is equivalent to the length of the extraction zone and the width a typical width lying for example between 10 and 200 µm. Juxtaposed with this microstructure, an interstitial zone with a double width 4.2 has the same length. This elementary structure is repeated periodically over a width of around 1 centimetre. A second structure is represented by the microstructure 4.3 and the interstitial zone 4.4. It can therefore be seen that this first zone extracts one third of the light intensity of the incident beam, two thirds being reflected on the interstitial zones in order to reach a zone Z2. This second zone also consists of a repetitive structure composed of a first microstructure 4.5 with a width triple the width of the microstructure of the first zone and an interstitial zone 4.3 with the same width as the microstructure. Only the rays not extracted by the first zone arrive on the second zone, half of which is then extracted by this zone Z2. It can therefore be seen that the choice made of the relative sizes of the microstructures of the two zones has the effect that the same percentage of the light emitted by the source is extracted in each zone. This is because the first zone extracts one third of the incident rays while the second zone extracts half of two thirds of the rays not extracted by the first zone. In the end, each zone therefore extracts one third of the incident rays. The extraction is therefore homogeneous between the two zones.

The injection lens makes an angle correspond to each point on the object the image of which is being made.

Consequently the step s between two bounces changes according to the point considered on the object, and takes values within a certain range. There is then created, for a position on the first zone, an offset of the impact on the second zone following the point of the object the image in question of which is being made. The impression of the pattern of the first zone thus varies on the pattern of the second zone. This may give rise to the appearance of black bands if the zones are not constructed so as to take account of this offset. The structure described above takes into account the effect of the offset, the reflectivity is constant whatever the offset and therefore for all the points of the object the image of which is being made.

Figure 6:
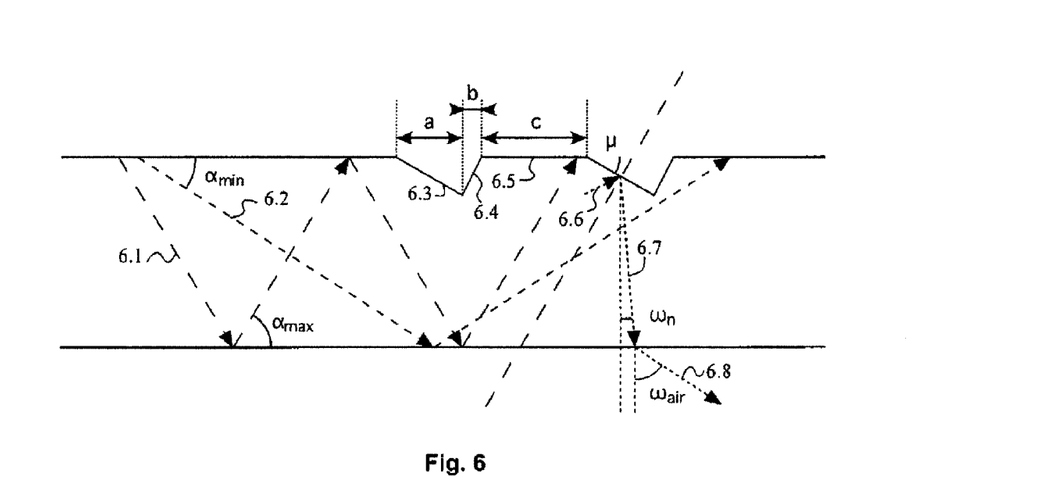
FIG. 6 illustrates a particular embodiment of the extraction section.

FIG. 6 illustrates a particular embodiment of the microstructures. In this embodiment, of hollow type, the prisms are oriented towards the inside of the guide rather than towards the outside as in the so-called projecting mode. They are said to be projecting when the point of the prism furthest away from the plane defined by the parallel face on which they are constructed is such that the thickness is at this point greater than the thickness of the guide at the flat section separating two prisms. Where this thickness is smaller, they are hollow.

The extraction section is composed of hollow prisms formed by a mirror 6.3 the reflection of which is total and a connecting surface 6.4 that makes it possible to return to the level of the surface 6.5 of the guide. Let the angle formed by the extraction mirrors 6.3 of the microstructures with the faces of the guide be called µ. These mirrors transform the incident rays 6.1, 6.2 or 6.6, propagating in the guide with an angle α with the faces of the guide, into 6.7 forming an angle $\omega_n$ in the guide with the normal to the faces. This angle $\omega_n$ is such that the ray then emerges from the guide by refraction. After this emergence from the guide, the ray 6.8 then forms an angle $\omega_{air}$ with the normal to the faces of the guide.

It can be noted that the projection onto the surface of the guide of the mirror has a length a, the projection of the surface 6.4 has length b and the distance between two microstructures a length c.

Figure 5:
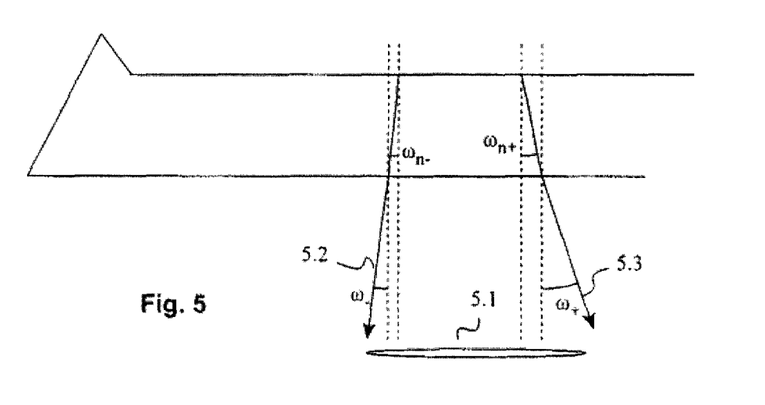
FIG. 5 illustrates the definition of the limit angles of the exit image.

FIG. 5 illustrates the exit from the guide. To construct optical guide like the one described here, the first step is to determine what is called the "eye box" 5.1, that is to say the extent of the image extracted and the direction thereof. The exit from the guide is therefore determined, which is characterised by the two extreme fields or rays 5.2 and 5.3 denoted respectively $\omega_-$ and $\omega_+$. It should be noted that, the image not necessarily being centred on the normal to the parallel faces, these two numbers are not necessarily such that one is the opposite of the other, although in practice this is often the case.

The angle µ of the extraction mirrors being chosen, these angles $\omega_-$ and $\omega_+$ of the limit rays of the exit image define the angles $\omega_{n-}$ and $\omega_{n+}$ made by the corresponding rays in the guide. To these rays in the guide there correspond incident rays before the reflection in the extraction mirror forming respective limit angles $\alpha_{max}$ and $\alpha_{min}$ vis-à-vis the faces of the optical guide.

The angle μ can be associated with a reference ray, for which the ray is parallel to the surface of the mirror. This ray is not necessarily in the range [$\alpha_{min}$, $\alpha_{max}$] determined by the image to be produced. There is the μ=α and therefore the equation:

$$\alpha = \mu = \frac{\pi/2 - \omega_n}{3};$$

Where the mirrors are hollow in the guide, it is clear that, in order to prevent stray reflections, the angle μ must be less than a certain value: the one that is associated with $\omega_+$ by the above formula. In this case, $\mu \leq \alpha_{min}$. Consequently the rays propagating in the guide and coming from the field $\omega_+$ will not be able to intercept the mirror after reflection on the parallel face on which the mirror will be built: these rays will at worst be parallel to the mirrors. As the other fields are more inclined with respect to the parallel faces, they also do not intercept the mirrors under the same conditions.

Taking an angle μ smaller than the limit angle given by formula also makes it possible to obtain manufacturing tolerances. This corresponds in fact to obtaining an extreme field that is larger than it is in reality and thus the centring imperfections will have a lesser effect on the quality of the image.

The case can also be considered where μ is taken to be higher than the value associated with $\omega_-$. In this case, $\mu \geq \alpha_{max}$. At this moment, the stray rays will all have an angle with respect to the parallel faces greater than $\alpha_{max}$. This is because, if a ray angle α is reflected on the mirror coming from the face parallel where the mirror is built, it has after reflection an angle equal to $\mu+(\mu-\alpha) \geq \alpha_{max}$ ($\alpha_{max}-\alpha) \geq \alpha_{max}$. These parasitics then no longer interfere with the image. The stray image commences at worst just alongside the extreme field, appearing as an image seen in a mirror of the required image.

However, when the angle differences are small, the number of rays intercepted is small, tending towards 0 when the angle α tends towards the angle $\alpha_{max}$. The luminance of the stray image is also small compared with the main image, which means that it interferes little. The most inclined rays also being those to be extracted first, creating parasitics from these rays does not give rise to significant losses of light. It should all the same be noted that this situation is in absolute terms less favourable than the case $\mu \leq \alpha_{min}$ since a stray image is created all the same, even if this does not directly interfere with the image sought.

In this case, it is also found that the angle $\alpha_{min}$ is smaller than in the first case. This is an advantage, since the spot formed by the beam injected for a given field on a parallel face will then be larger, which makes it possible to broaden the extraction zone. This having been said, the tolerances on the parallelism of the faces then become more constraining.

When the prisms are hollow, there therefore exists a range for the value of the angle μ formed by the extraction mirrors with the faces of the guide that gives rise to the generation of stray rays that may interfere with the perception of the exit image. Advantageously choosing an angle μ in this range, between $$\mu_- = \frac{\pi/2 - \omega_{n+}}{3} \text{ and } \mu_+ = \frac{\pi/2 - \omega_{n-}}{3},$$

is therefore avoided in order not to create parasitics that will directly influence the image, by a sort of folding of the image on itself.

Another important feature of hollow and projecting prisms is the order of position between the prisms, the connecting sections and the parallel sections. To afford quality imaging, the angle μ made by the mirrors with the parallel faces, for example between the mirror 6.6 and the surface 6.5 of the guide, must be constant for all the microstructures, failing which the image is interfered with.

When the prisms are projecting, the choice of the angle is free with regard to parasitics. This is because only the rays to be extracted can be intercepted by the mirror.

The periodic pattern is composed of three parts. The first is the mirror proper. The length a of its orthogonal projection on the parallel face is constrained firstly by diffraction which, in order to preserve correct imaging quality, requires a minimal size. In addition, the thickness of the guide and comfort of observation require the length to be limited.

The second part is that of the connection joining the end of the mirror and the parallel face. The length b of its projection on the parallel face is positive in order to allow easy manufacture. It also has an upper limit $b_{max}$: if the angle formed by the connection with the parallel face is less than $\alpha_{max}$, either vignetting occurs, or stray rays appear. Even if this connection is not flat, it must comply with this rule by remaining on the same side of the plane that ensures the absence of vignetting and stray rays in order to preserve such effects. The length $b_{max}$ corresponds to the minimum length of the shadow formed by the mirror according to the fields.

The third and last part is a flat section. It makes it possible both to see through the guide and to ensure propagation in the guide of the rays that it is wished to be extracted later. Its length c is positive because of its nature, it is also determined by the proportion of the rays that it is wished to extract.

Figure 8:
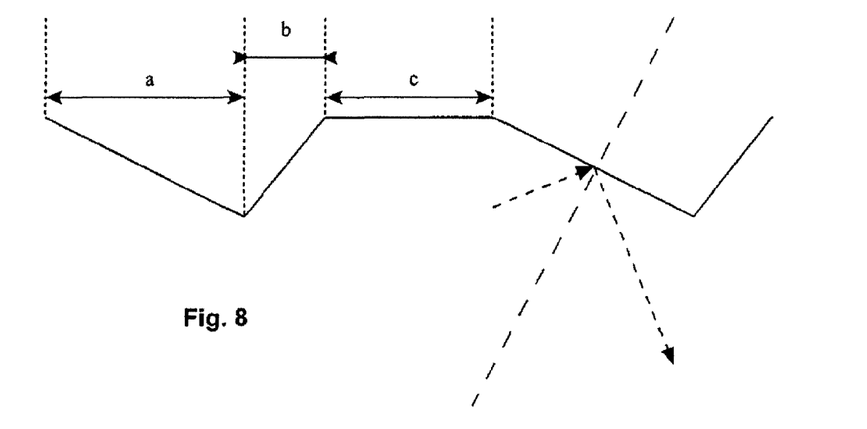
FIGS. 8 and 9 illustrate the sizing of the extraction zone in two embodiments of the extraction section.
Figure 9:
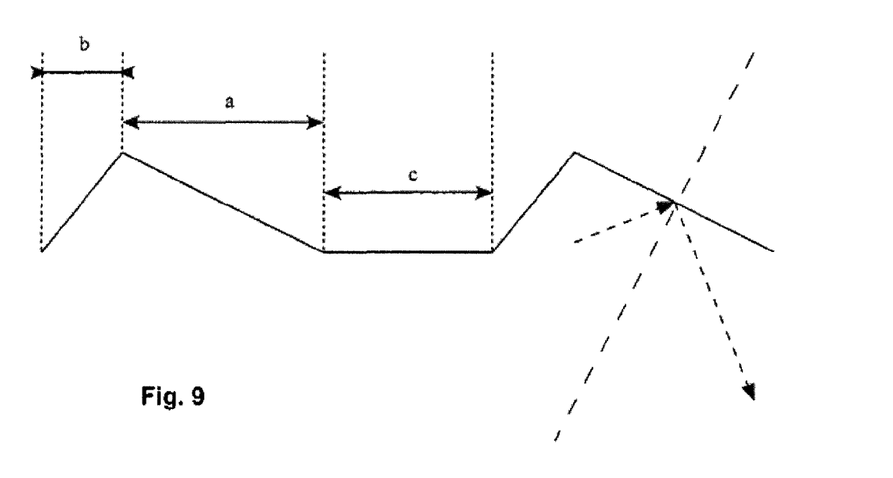

This arrangement is found in FIG. 8. In comparison, in the case of projecting prisms in FIG. 9 the order of the parts changes. The connection comes first of all, and then the mirror and finally the section parallel to the faces.

Advantageously, in the context of a system where it is wished both to see the image transported by the guide and the environment through the guide (the so-called-see-through case), it proves necessary for these parts to have other characteristics. If the guide is inserted in a medium with a similar index, the connection does not divert the rays. On the other hand, if the guide is immersed in a medium with an index different from its own, the connection will divert the rays if b is strictly positive. It is then advantageous for the connection also to have a reflective or opaque coating so as to prevent the view of the user being interfered with.

As the relative quantity of rays extracted depends on a, b and c, it is possible, by varying them, to modulate this quantity. It is thus possible to create several zones where the quantity of rays extracted increases, so as to high the absolute quantity of rays extracted constant between all the zones and to ensure a certain uniformity of the image.

The size of the zone is linked directly to the distance traveled, by a ray, starting from a parallel face and reflecting on the other parallel face in order to return to the first face. This distance, also equal to the width of the impression of the beam on the parallel faces, in the case of good injection, depends on the propagation angle of the rays and the thickness of the guide. Thus the rays that are least inclined in the guide having the smallest impressions and also having preferably to propagate further in the guide before being extracted, the size of the sections will rather be judiciously defined with reference to the impression of the rays most inclined in the guide. According to the extraction rate of the zones and the distribution of the patterns, it is thus possible to generate several sections (1, 2, 3, . . . ) so as to illuminate uniformly the zone where the eye has to be positioned and also maintain good uniformity of the projected image. A large number of sections allows a wide ocular zone and/or a large angular size of the projected image.

Figure 7:
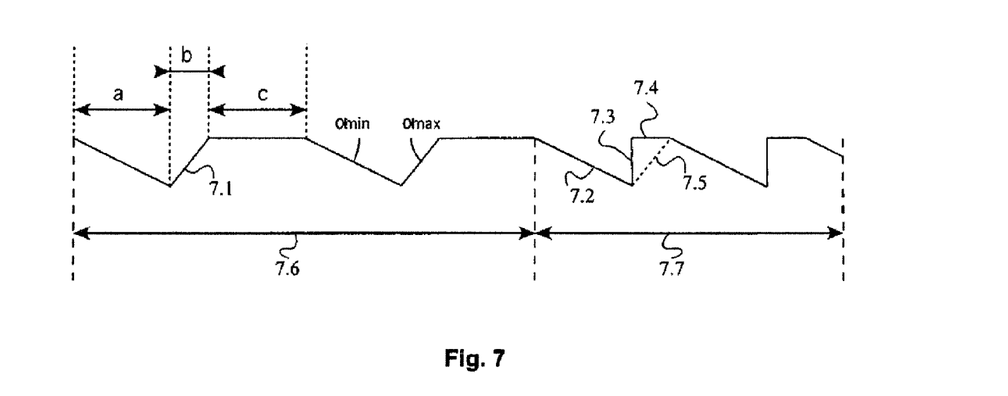
FIG. 7 illustrates a particular embodiment of two zones of the extraction section.

FIG. 7 illustrates an example embodiment of an extraction zone in two sections. A first section 7.6 is produced with hollow microstructures 7.1 as described above. It is characterised by the chosen values of a, b and c. The angles made by the mirror on the one hand and the connection on the other hand can for example take respectively the values $\alpha_{min}$ and $\alpha_{max}$. It is possible to take for example for this first zone c=a and b=$b_{max}$. In the second zone 7.7, values of b=0 and c=$b_{max}$ are taken, the remaining unchanged. In other words, the same mirror surface 7.2 is kept. If the connection had been kept as in the first zone represented in broken lines 7.5, the flat surface between the microstructures disappeared. Instead of this, a vertical connection surface 7.3 is implemented in order to recreate a flat 7.4 that allows vision through the guide. All the rays are extracted in the second zone, whereas half of them are extracted in the first zone. Half of the starting useful rays are therefore extracted in the first zone, and then the remaining half in the second zone.

In this case, if $\alpha_{min}$=27.4° and $\alpha_{max}$=43.9° is taken, then $b_{max}$=a*tan($\alpha_{min}$)/tan($\alpha_{max}$) that is to say approximately 0.54a. If the mirrors and connections are perfectly opaque and the transparent sections transmit all the incident light from the environment, the transmission is approximately 39% in the first zone and approximately 35% in the second. This organisation makes it possible to keep approximately a constant transmission for the light coming from the external environment.

The zones in line with the parallel faces of the guide before and after the extraction zone can be treated so as to become semi-reflective in order to harmonise the transmission of the external scene between the extraction zone and the other zones, without interfering with total internal reflection of the rays of the image to be projected inside the guide.

The invention can also apply to an optical guide the two faces of which are curved, parallel or not. The deformations caused by this curvature and by any non-parallelism can then be compensated for, by the optical device used for generating the beam, before injection thereof into the guide. Such optical guides can be used for manufacturing ocular vision optical systems. In this case the optical guide can constitute the glass of the spectacles or be integrated there in.

According to a particular embodiment of the invention, the flat surfaces between the microstructure 6.5 are not aligned with one another. They remain parallel despite everything. It is thus possible to vary the thickness of the guide by reducing the distance between these zones and the extraction surface. It is thus possible to act on the form of the optical guide without impairing its functional qualities.

The structure in two zones proposed is indicative. It is possible to conceive of extraction zones having more than two extraction zones or only one. Moreover, the use of microstructure in a continuous band over the entire length of the extraction zone can be replaced by any type of arrangement such as a chequerboard arrangement.

The invention claimed is:

1. Device for the optical guidance of a light beam (1.3) transporting an image, comprising:
a material forming a guide (1.5) provided with two faces (2.3, 2.4);
an injection section (1.4) for entry of the light beam into the guide (1.5), the beam (1.6) propagating in the guide by successive reflections on the two faces (2.3, 2.4) of the guide;
an extraction section (1.7) for exiting of the beam;
characterised in that the extraction section comprises a plurality of microstructures situated on the surface of one of the two faces (3.2) of the guide (1.5) and each microstructure comprising a flat surface (3.4) causing the exiting from the guide of the light rays (3.5) of the beam striking the said flat surface (3.4) and at least one transparent interstitial zone formed from a flat section parallel to the surface of the guide and disposed between the said microstructures.

2. Optical guidance device according to claim 1, characterised by the fact that the two faces of the guide are parallel.

3. Optical guidance device according to claim 2, characterised by the fact that the two faces of the guide are flat, the light beam transporting the image then being collimated.

4. Optical guidance device according to claim 3, characterised in that, the flat surface (3.4) of each microstructure is reflective, such that the light rays (3.5) of the beam striking the said flat surface (3.4) leave the guide through the face of the guide opposite to the face (3.2) on which the said microstructure is situated.

5. Optical guidance device according to claim 4, characterised in that each said microstructure is composed of a prism projecting on the face of the guide (3.2).

6. Optical guidance device according to claim 4, characterised in that each said microstructure is composed of a hollow prism on the face of the guide (6.3, 6.4).

7. Optical guidance device according to claim 1, characterised in that the said extraction section is composed of several zones, each zone being characterised by a particular arrangement of the microstructures and interstitial zones.

8. Optical guidance device according to claim 1, characterised in that each microstructure is a band over the entire length of the extraction zone.

9. Optical guidance device according to claim 1, characterised in that, an exit image defines two extreme rays forming respectively angles ω– and ω+ with the normal to an extraction surface of the guide outside the guide and $\omega_{n-}$ and $\omega_{n+}$ with the normal to the extraction surface of the guide inside the guide, and the angle μ formed by a mirror with the extraction surface has a value less than an angle $$\mu_- = \frac{\pi/2 - \omega_{n+}}{3}$$

or greater than an angle $$\mu_+ = \frac{\pi/2 - \omega_{n-}}{3}.$$

10. Method of manufacturing an optical guidance device according to claim 1, characterised in that it comprises the following steps:
a step of generating a plurality of microstructures and at least one transparent interstitial zone formed from a flat section parallel to the surface of the guide and disposed between the said microstructures on the surface of one of the two faces of an optical guide by moulding the said guide;
a step of depositing a reflective thin film on one of the faces of each said microstructure.

11. Ocular vision optical system, characterised in that it comprises an optical guidance device according to claim 1.

12. A device configured for the optical guidance of a light beam transporting an image, the device comprising:
- a guide with two faces;
- an injection section configured for entry of the light beam into the guide, with the beam propagating in the guide by successive reflections on the two faces of the guide;
- an extraction section configured for exiting of the beam;
- the extraction section comprising a plurality of microstructures situated on one of the two faces of the guide, each microstructure comprising a flat surface configured for causing the exiting from the guide of the light rays of the beam striking the flat surface, and at least one transparent interstitial zone formed from a flat section parallel to the one face of the guide and disposed between the microstructures.

13. The device according to claim 12, wherein the two faces of the guide are parallel.

14. The device according to claim 13, wherein the two faces of the guide are flat.

15. The device according to claim 14, wherein the flat surface of each microstructure is reflective, such that the light rays of the beam striking the flat surface leave the guide through the face of the guide opposite to the face on which the microstructure is situated.

16. The device according to claim 15, wherein each microstructure comprises a prism projecting on the face of the guide.

17. The device according to claim 15, wherein each microstructure comprises a hollow prism on the face of the guide.

18. The device according to claim 12, wherein the extraction section comprises several zones, each zone comprising a particular arrangement of the microstructures and interstitial zones.

19. The device according to claim 12, wherein each microstructure is a band over the entire length of the extraction zone.

20. A device configured for the optical guidance of a light beam transporting an image, the device comprising:
- a guide with two flat and parallel faces;
- an injection section configured for entry of the light beam into the guide, with the beam propagating in the guide by successive reflections on the two faces of the guide;
- an extraction section configured for exiting of the beam;
- the extraction section comprising several zones, each zone comprising a plurality of microstructures and transparent interstitial zones situated on one of the two faces of the guide with each microstructure being over the entire length of the extraction zone, each microstructure comprising a hollow prism on the face of the guide with a reflective flat surface configured for causing the exiting from the guide of the light rays of the beam striking the flat surface, each interstitial zone formed from a flat section parallel to the one face of the guide and disposed between the microstructures.

* * * * *